A. L. BANKER.
WIND SHIELD.
APPLICATION FILED DEC. 18, 1907.
1,005,135.
Patented Oct. 10, 1911.
2 SHEETS—SHEET 1.
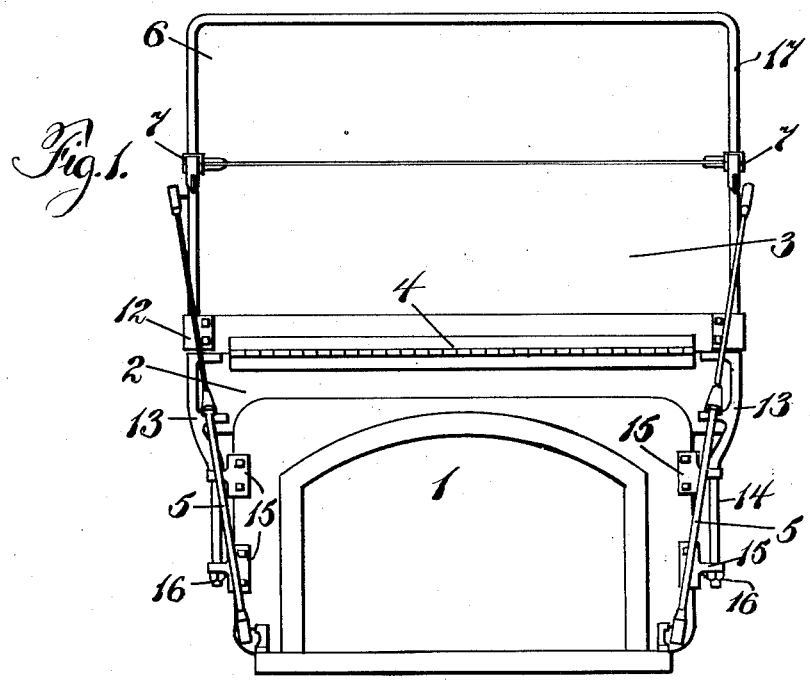
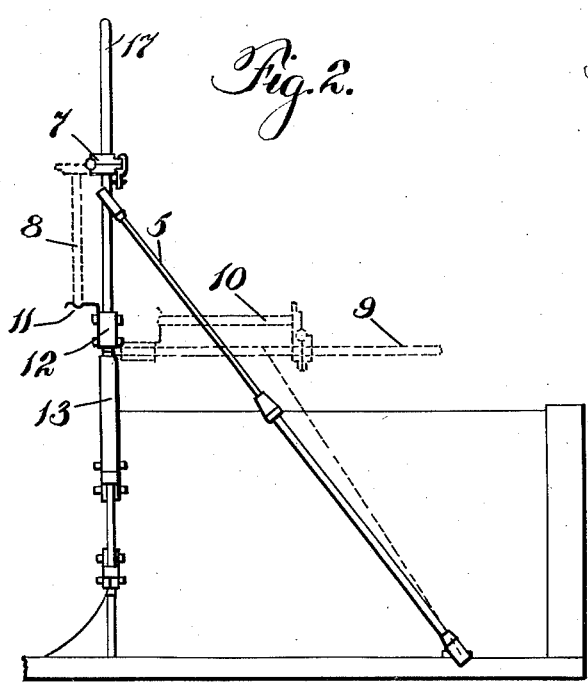
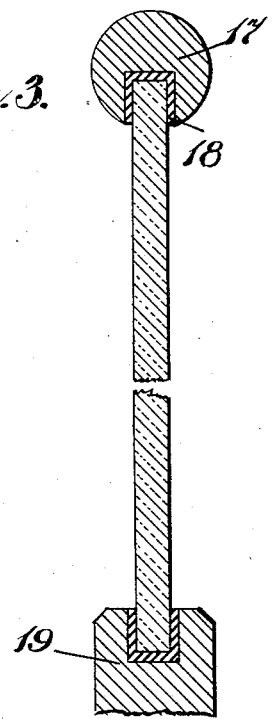
WITNESSES
Harvey L. Lechner
J. C. Bradley
INVENTOR
Arthur L. Banker
by atty
Paul Synnestvedt

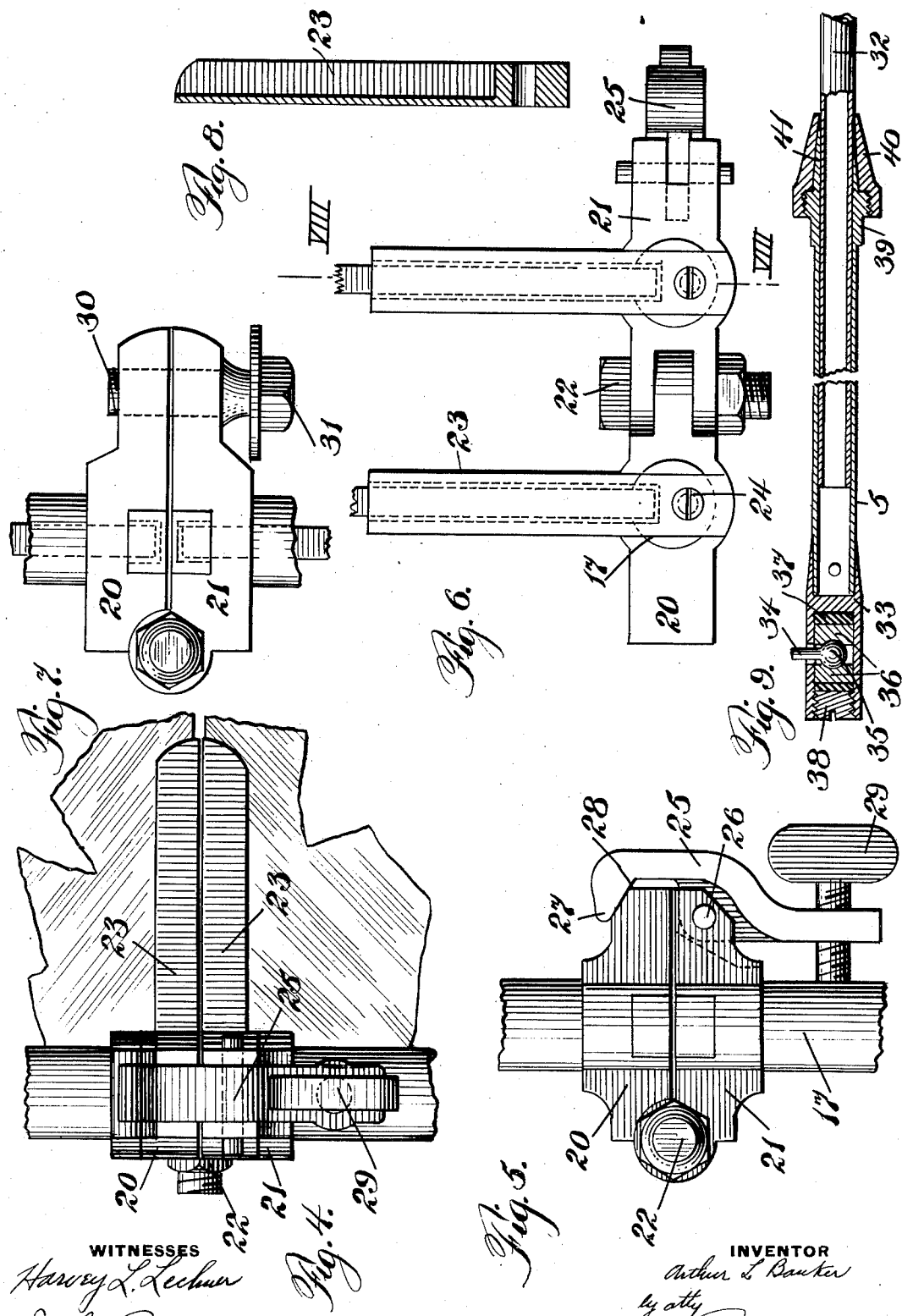

UNITED STATES PATENT OFFICE.

ARTHUR L. BANKER, OF PITTSBURGH, PENNSYLVANIA.

WIND-SHIELD.

1,005,135.  Specification of Letters Patent.  Patented Oct. 10, 1911.

Application filed December 18, 1907. Serial No. 406,969.

*To all whom it may concern:*

Be it known that I, ARTHUR L. BANKER, a citizen of the United States, residing at Pittsburgh, in the county of Allegheny and State of Pennsylvania, have invented certain new and useful Improvements in Wind-Shields, of which the following is a specification.

The invention relates to wind shields for vehicles, and has for its objects; the provision of a shield having an improved and simplified form of frame so constructed as to give a maximum amount of rigidity with the least possible area to obstruct the line of vision; the provision of a shield so constructed as to fold in a very convenient and compact form; and the provision of improved and simplified means for hinging the upper and lower sections together and for holding the upper section in folded position. One embodiment of the invention is illustrated in the accompanying drawings, wherein:—

Figure 1 is a partial front view of a vehicle with my improved shield applied thereto, the shield being in upright position, Figure 2 is a partial side elevation of the vehicle with the shield applied thereto, the shield shown in upright position in full lines, and in its various adjusted positions in dotted lines, Figure 3 is an enlarged transverse section through the shield, Figure 4 is an enlarged detail front view of the securing means between the two shield sections, Figure 5 is a side elevation of the parts shown in Figure 4, Figure 6 is a plan view of the hinge shown in Figs. 4 and 5 in open position, Figure 7 is an enlarged side elevation of a securing means similar to that shown in Figure 5 but with a modified form of locking device for the ends of the blocks, Figure 8 is a longitudinal section through the clip for the glass on the line VIII—VIII of Figure 6, and Figure 9 is an enlarged longitudinal section through the telescoping rods for holding the shield in position.

Referring first to the general arrangement of parts as shown in Figures 1, 2 and 3, 1 is the hood of the automobile, 2 is the bottom board of the shield which is detachably mounted upon the front of the vehicle, 3 is the bottom section of the shield, which is hinged to the member 2 by means of the extended hinge 4, 5 are the telescoping tubes for holding the bottom section 3 in position, which rods are secured by means of universal joints to the bottom section of the shield 3 and to the vehicle, and 6 is the upper shield section, which section is hinged to the bottom shield section 3 at 7 ( Figure 2.) In Figure 2 the shield is shown in full lines in elevated position, and in its various adjusted positions in dotted lines, the dotted section marked 8 being the position occupied by the upper section of the shield when it is desired to dispense with such upper section without folding down the entire shield, the numeral 9 indicating the position occupied when the entire shield is swung about its hinge 4 to a position over the hood 1, and the numeral 10 representing the shield in a position similar to that indicated by 9 with the exception that the upper section 9 is folded back on top of the section 3. The upper section 6 of the shield is held securely in the position marked 8 and 10 by means of clips 11 at each end, which is curved to fit the top of the frame of the shield, and has spring engagement therewith. The spring clips 11 are held to the bottom section 3 by means of the bolts which pass through the clip members 12. The bottom board 2 is secured removably to the vehicle by means of the downwardly extending arms 13 which encircle the ends of the board 2 and carry at their lower ends the shouldered rod portions 14 engaging the clips 15 and held in position by means of the nuts 16.

The frame for the glass sections 3 and 6 is one of the important features of my invention and is shown most clearly from the cross section of Figure 3. From this figure and Figure 1 it will be seen that the two side members and the top member of the shield frame consist of a rod 17, which rod is provided with a slot on its inner edge for the reception of the glass. This slot is further provided with a rubber strip 18, which strip is U shaped in cross section as indicated in Figure 3, and is adapted to protect the glass from shocks. The lower edge of the glass fits into a similar recess in the wooden frame member 19 to which the hinge 4 is secured. The slotted rod constitutes a most desirable form of frame for the reason that it may be made much narrower than the wooden frames heretofore used, and consequently obstructs the line of vision less, and furthermore it is much stiffer and more durable than the sheet metal tubular or jointed wooden frames heretofore used. The frame may be furthermore very easily and cheaply constructed as the rod 17 may be milled before bending, and afterward bent about a form of the exact shape desired. It will also be found when the securing means between the two shield sections is fully described hereinafter that the rod frame 17 forms a very desirable means upon which to secure the hinge blocks, a wooden frame sufficiently strong to rigidly support hinge blocks necessarily being very large and cumbersome.

The hinging means between the bottom section 3 and upper section 6 constitutes a novel feature of my invention and is shown in detail in Figures 4, 5 6 and 8. Referring to these views it will be seen that the ends of the frame members 17 are provided with transverse blocks 20 and 21 hinged together by the member 22. It will be seen from Figure 6, that the blocks 20 and 21 are provided with transverse cylindrical openings for the reception of the ends of the frame members 17, and that the face of each of these blocks is provided with a transverse clip or bracket 23, which engages the edge of the glass and securely holds it. The clips are secured in the faces of the blocks 20 and 21 by means of the screws 24 passing down into the ends of the frame members 17. The parts are all held in their proper relative positions by brazing although any desired means may be obviously employed for accomplishing this result. The clips 23 are preferably lined with rubber in the same manner as heretofore described with respect to the frame 17. The outer ends of the blocks 20 and 21 are preferably secured together by means of the locking lever 25, which lever is pivoted to the block 21 at 26, and has a nose 27 at its upper end for engaging the end of the block 20. Inclined engaging surfaces 28 are provided on the lever and block 20 in order that a camming engagement be secured and lost motion due to wear and other causes avoided. The lever is operated by means of the thumb screw 29 engaging the frame member 17. It will be seen from the foregoing that the blocks 20 and 21 are very rigidly and securely held in position upon the frame members 17, the edges of the glass are very securely inclosed and held by the clips 23, and the blocks are releasably locked together in such manner that a tight though easily releasable engagement is secured.

In Figure 7 an alternative form of securing means for the ends of the blocks is illustrated, such securing means being simply a transverse threaded stud 30 provided with a head 31 for engagement with a wrench. Figure 9 shows in detail the construction of the telescoping rods for supporting the shield in position. Hollow rods 5 and 32 are employed, and each of these rods carries at its ends a socket 33 in which the universal joint is mounted. This universal joint consists of the rod 34 bearing the ball 35, which ball takes against the bearing blocks 36. Rubber disks are applied at either end of the bearing blocks 36 in order to give a tight contact between the ball and the bearing blocks, and the parts are finally secured in position by means of the screw plug 38. In order to clamp the two rods together in any adjusted position, the two members 39 and 40 are provided, the member 39 having a thin split end 41 with which the member 40 has a compressing action so that when such member 40 is screwed down it will compress the portion 41 against the rod 32 and lock it in position. By way of further modification, the clip 23 may be changed in shape, and if desired extended clear from one side of the shield to the other.

Having thus described my invention and illustrated its use, what I claim as new and desire to secure by Letters Patent is the following:—

1. The combination with a sectional wind shield, of means for hinging the opposing side frame members together comprising at each end a pair of coöperating transverse blocks hinged together at one of their ends and means for securing the other ends together comprising a locking lever pivoted to one block and having an inclined camming surface adapted to engage the end of the other block and a screw extending through the said lever and bearing at one end upon the side frame member for securing the locking lever in locked position.

2. The combination with a sectional wind shield having side frame members, of means for hinging the opposing side frame members together comprising at each side a hinge and a pair of coöperating blocks carried by the free ends of the side frame members, and glass holding brackets carried by the blocks and projecting inwardly therefrom with their inner ends free and their outer ends supported by the said blocks.

3. The combination with a sectional wind shield having side frame members, of means for hinging the opposing side frame members together comprising at each side a hinge and a pair of coöperating blocks carried by the free ends of the side frame members, and glass holding brackets carried by the upper blocks transverse thereto and projecting inwardly therefrom with their inner ends free and their outer ends supported by the said blocks.

4. In combination in a sectional wind shield, lower side frame members, upper side frame members having their ends grooved, glass holding brackets having their outer ends seated in the grooves and rigidly secured therein and with their inner ends free, and means for hinging the upper and lower side frame members together.

5. In combination in a sectional wind shield, lower side frame members provided at their upper ends with hinge blocks, upper side frame members provided at their lower ends with hinge blocks hinged to the first mentioned hinge blocks and having transverse grooves in their lower faces, and glass holding brackets having their outer ends rigidly secured in said grooves and with their inner ends free.

6. In combination in a sectional wind shield, lower side frame members provided at their upper ends with hinge blocks, upper side frame members, hinge blocks perforated to receive the lower ends of the upper side frame members, the lower ends of such side frame members and the lower faces of the hinge blocks carried thereby being grooved transversely, glass holding brackets having their outer ends rigidly secured in the said grooves, and with their inner ends free, and means for hinging the opposing blocks together.

In testimony whereof I have hereunto signed my name in the presence of the two subscribed witnesses.

ARTHUR L. BANKER.

Witnesses:
DOERING BELLINGER,
ARCHWORTH MARTIN.